United States Patent [19]

Drent et al.

[11] Patent Number: 5,488,096
[45] Date of Patent: Jan. 30, 1996

[54] COPOLYMERS OF CARBON MONOXIDE AND AN OLEFINICALLY UNSATURATED COMPOUND AND PROCESS FOR THE PREPARATION THEREOF

[75] Inventors: Eit Drent; Dennis H. L. Pello, both of Amsterdam, Netherlands

[73] Assignee: Shell Oil Company, Houston, Tex.

[21] Appl. No.: 258,406

[22] Filed: Jun. 9, 1994

[30] Foreign Application Priority Data

Jun. 29, 1993 [EP] European Pat. Off. ............. 93201894

[51] Int. Cl.⁶ .................................................. C08G 37/02
[52] U.S. Cl. .......................................... 528/392; 528/271
[58] Field of Search ..................... 528/392, 271

[56] References Cited

U.S. PATENT DOCUMENTS 2,495,286  1/1950  Brubaker .

FOREIGN PATENT DOCUMENTS

| 213671-A1 | 3/1987 | European Pat. Off. . |
| 280380 | 8/1988 | European Pat. Off. . |
| 1522942 | 8/1978 | United Kingdom . |

*Primary Examiner*—Shelley A. Dodson

[57] ABSTRACT

It is disclosed a linear random copolymer of carbon monoxide and one or more olefinically unsaturated compounds wherein the polymer chain contains units originating from the olefinically unsaturated compound(s) and monomer units originating from carbon monoxide in a molar ratio of from 52.5:47.5 to 80:20.

It is further disclosed a process for the preparation of linear random copolymers of carbon monoxide and one or more olefinically unsaturated compounds, wherein the monomers are contacted with a catalyst composition comprising a source of palladium and an anionic phosphorus monodentate ligand in a molar ratio of carbon monoxide to the olefinically unsaturated compound(s) in the range of from 1:30 to 1:3.

15 Claims, No Drawings

COPOLYMERS OF CARBON MONOXIDE AND AN OLEFINICALLY UNSATURATED COMPOUND AND PROCESS FOR THE PREPARATION THEREOF

BACKGROUND OF THE INVENTION

The invention relates to linear copolymers of carbon monoxide and an olefinically unsaturated compound and to a process for the preparation thereof.

EP-A-213671 discloses copolymers of carbon monoxide, ethene and one or more other olefinically unsaturated monomers (A), said copolymer consisting of units —CO—($C_2H_4$)—and —CO—(A)— (A)— whereby the units —CO—($C_2H_4$)— and —CO—(A)— are randomly distributed along the polymer chains. Hence, the copolymer is a linear alternating copolymer of carbon monoxide and ethene or another olefinically unsaturated monomer A on the other hand. The advantage of these polymers as compared to the high molecular weight linear alternating copolymers of carbon monoxide with ethene exclusively is that it has a lower melting point, enabling the melt processing of the polymer to take place at a lower temperature. This lower processing temperature in return reduces decomposition and discoloration of the polymer during processing. However, it is a disadvantage that at least one other olefinically unsaturated monomer beside ethene is necessary for preparing the polymers with reduced melting point, so that the total number of olefinically unsaturated monomers is at least two.

The polymers disclosed in EP-A-213671 have good mechanical properties, especially at elevated temperature, and have utility as engineering polymers.

Prior art references, such as U.S. Pat. No. 2,495,286 and G.B. A-1522942 disclose non-alternating copolymers of carbon monoxide and an aliphatic monoolefin, preferably ethene, prepared by using a free radical catalyst, thus accomplishing a free radical polymerization of the said carbon monoxide and aliphatic monoolefin. In these references, copolymers of carbon monoxide and ethene are described having molar ratios ethene to carbon monoxide varying from as low as 1.16:1 to as high as 20:1. The copolymers disclosed in said British patent specification have a molar ratio ethene to carbon monoxide of close to unity.

The ethene/carbon monoxide copolymers described in U.S. Pat. No. 2,495,286 and G.B. A-1522942 have melting points which are lower than those of corresponding perfectly alternating copolymers. However, it will be appreciated by persons skilled in the art that these copolymers do not have a linear structure but rather a branched structure due to the free radical polymerization mechanism. A drawback of polymers having a branched structure is their relatively high melt viscosity and that their melt processing may be seriously hampered. Moreover, well known disadvantages of free radical initiators are that they are storage unstable and that remnants of such initiators which can be detrimental to the polymer stability may be present in the prepared polymer.

It would be desirable to obviate the above-mentioned disadvantages associated with carbon monoxide based polymers.

EP-A-280380 discloses a process for producing linear alternating copolymers of carbon monoxide and one or more olefinically unsaturated compounds using catalyst compositions based upon a palladium compound and a phosphinosulphonic acid ligand. The examples of this European application teach that said linear alternating copolymers can be prepared by applying in the polymerization mixture the olefinically unsaturated compounds at a molar ratio relative to the carbon monoxide of approximately 1:1.

SUMMARY OF THE INVENTION

It has now surprisingly been found that linear, non-alternating copolymers of carbon monoxide with an olefinically unsaturated compound can be obtained by a process which involves applying a relatively high molar ratio of olefinically unsaturated monomer relative to carbon monoxide in the polymerization mixture thereby using a catalyst composition as disclosed in EP-A-280380. The polymers thus differ from polymers made by radical polymerization in that they are linear instead of branched. It has further been found that such linear non-alternating polymers exhibit a lower melting point than the corresponding linear alternating polymers.

Accordingly, the present invention relates to a copolymer of carbon monoxide and one or more olefinically unsaturated compounds, characterized in that the polymer chain is linear and contains monomer units originating from the olefinically unsaturated compound(s) and monomer units originating from carbon monoxide in a molar ratio of from 52.5:47.5 to 80:20, wherein at least in a part of the polymer chain these monomer units are arranged in a random order.

The invention also relates to a process for the preparation of a copolymer of carbon monoxide and one or more olefinically unsaturated compounds, of which copolymer the polymer chain is linear and contains monomer units originating from carbon monoxide which are, at least in a part of the polymer chain, arranged in a random order, which process comprises contacting carbon monoxide and one or more olefinically unsaturated compounds in the presence of a catalyst composition comprising:

(a) a source of palladium, and (b) an anionic phosphorus monodentate ligand of the general formula $R_1R_2P$—R—X, wherein $R_1$ and $R_2$ independently represent optionally polar substituted hydrocarbyl groups, R is a bivalent bridging group having 2 carbon atoms in the bridge and X is an anionic group, which anionic ligand is derived from an acid having a pKa of less than 4, wherein the molar ratio of carbon monoxide to the olefinically unsaturated compound(s) is in the range of from 1:30 to 1:3 and preferably from 1:15 to 1:5.

DETAILED DESCRIPTION OF THE INVENTION

The term "linear" as used throughout this specification in connection with a polymer means that the polymer backbone is substantially free of polymeric side-chains formed during polymerization, i.e. to the extent that such side chains are not detectable by analysis of the virgin polymer powder as obtained from a polymerization reactor. This implies that less than 0.5% of the monomer units originating from an olefinically unsaturated compound carries a polymeric side chain. The linear polymer differs from their branched counterparts by having different solubility characteristics.

The fraction of the bonds formed during polymerization between olefinically unsaturated monomers relative to the total number of bonds formed between the monomer molecules gives a clear indication of the non-alternating character of the copolymer. In a perfectly alternating copolymer said fraction expressed in percent is zero.

The higher this fraction is, the less likely it will be that the copolymer is semicrystalline or that it resembles a homopolymer of the olefinically unsaturated compound(s). This is detrimental to the mechanical properties of the polymer, in particular to its modulus and strength. On the other hand, when the fraction is low the copolymer will more closely resemble a perfectly alternating copolymer with the corresponding higher melting point. The value of the fraction is in the range of from 5 to 60%, typically from 7 to 40%. These fractions correspond with molar ratios of the monomer units originating from the olefinically unsaturated compound(s) to the monomer units originating from carbon monoxide amounting to from 52.5:47.5 to 80:20 and 53.5:46.5 to 70:30, respectively. Preferably the fraction is such that the copolymers of this invention are semicrystalline polymers having a melting point above 170° C.

The copolymers have, at least in part, a non-alternating structure which implies that the polymer chains contain entities consisting of two or more olefinically unsaturated monomer units bonded to one another, at each end near to a monomer unit originating from carbon monoxide.

The length of such entities may be determined by the reaction conditions utilized during the copolymerization reaction, such as the molar ratio of olefinically unsaturated compound relative to carbon monoxide.

In one preferred embodiment of the present invention, 50 to 95%, more preferably 65 to 85%, of all bonds between monomer units originating from olefinically unsaturated compounds is contained in entities consisting of two of such monomer units. The remaining bonds between monomer units originating from olefinically unsaturated compounds is contained in entities consisting of three or more of said monomer units.

In another preferred embodiment of the present invention, at least one end of the copolymer chain is a homopolymer block of the olefinically unsaturated monomer. A copolymer having one or two of such endblocks of homopolymerized olefinically unsaturated monomer can be obtained by e.g., employing at the start and/or end of the polymerization a reaction mixture being essentially free of carbon monoxide. Very suitable copolymers are those containing only one endblock of homopolymerized olefinically unsaturated monomer. Homopolymer end blocks suitably constitute of from 10 to 50% by weight of the total copolymer.

The olefinically unsaturated compounds useful as monomers in the copolymer of this invention may be any compound containing at least one double bond between two carbon atoms in the molecule, which double bond is susceptible to polymerization. A preferred class of olefinically unsaturated compounds are aliphatic monoolefins and in particular α-olefins, of which ethene, propene, 1-butene or mixtures thereof are useful representatives. Of these, ethene is particularly preferred.

The copolymers of the invention can be used in applications for engineering thermoplastics and in packaging.

The catalyst composition used comprises a source of palladium and an anionic phosphorus monodentate ligand of general formula $R_1R_2P-R-X$, wherein $R_1$ and $R_2$ independently represent an optionally polar substituted hydrocarbyl groups, R is a bivalent bridging group having 2 carbon atoms in the bridge and X is an anionic group. The ligand is derived from an acid having a pKa of less than 4, preferably having a pKa of less than 2.

The source of palladium may be elemental palladium or a palladium compound, suitably a palladium salt. Examples of useful palladium salts are palladium salts of a carboxylic acid. Palladium acetate is preferred.

Suitable anionic groups X of the phosphorus ligand are derived from organic acids, such as sulphonic acids and carboxylic acids. Of the anionic groups derived from these acids, the anionic group derived from sulphonic acid is preferred, i.e. the anionic group X of the general formula described above is preferably a sulphonic group, $-SO_3$.

The groups $R_1$ and $R_2$ may be the same or different and they represent aliphatic or aromatic hydrocarbyl groups typically having up to 10 carbon atoms, such as e.g. alkyl, cycloalkyl, alkenyl, aryl, arylalkyl, alkyaryl or functionalized derivatives thereof. Also useful are polar substituted hydrocarbyl groups. The polar substituents may be, e.g. alkoxy groups typically having up to 6 carbon atoms, of which methoxy is a particularly suitable representative. It is preferred that $R_1$ and $R_2$ are the same, while in a most preferred embodiment of the present invention, $R_1$ and R2 both represent a phenyl group.

The bridging group R, may be any bivalent group containing two carbon atoms in the bridge. Accordingly, R may be 1,2-ethylene, 1,2-propylene, 1,2-butylene or 2,3-butylene, and can also be 1,2-phenylene or 1-phenyl-1,2 ethylene. Preferred bridging groups are 1,2-ethylene and 1,2-phenylene.

The anionic phosphorus monodentate ligand is suitably incorporated in the form of an acid or as a salt, an acid being preferred.

In a particularly preferred embodiment of the present invention, the phosphorus ligand used as component (b) of the catalyst composition is derived from 2-(diphenylphosphino)-benzenesulphonic acid.

The process of the present invention may be carried out in the gaseous phase or in a liquid diluent, the last option being preferred. Suitable liquid diluents may be protic or aprotic diluents or mixtures thereof. Accordingly, useful protic diluents include lower alcohols, such as methanol and ethanol, while acetone, tetrahydrofuran and diglyme (bis(2)-methoxyethylene)ether) are examples of useful aprotic diluents. If a palladium salt such as palladium acetate is used as the source of palladium, an additional organic acid having a pKa of less than 4 may be present for the purpose of optimizing the catalytic activity of the catalyst composition. Such an acid may be helpful in removing the acetate groups from the palladium atom, which have not yet been replaced by the phosphorus monodentate ligand, so that the number of available catalytically active palladium sites can be increased. Particularly suitable for this purpose is a sulphonic acid, such as methanesulphonic acid, but other organic acids having a pKa of less than 4 may be used as well.

The amount of catalyst composition to be used in the process according to the present invention is not particularly critical and may vary within wide limits. Suitably, the amount of catalyst composition used is such that it contains in the range of from $10^{-7}$ to $10^{-3}$ and in particular $10^{-6}$ to $10^{-4}$ gram atom palladium per mol of olefinically unsaturated compound to be polymerized.

The process of the invention is preferably conducted at a temperature in the range of from 20° to 200° C., more preferably from 30° to 150° C., while the pressure preferably is in the range of from 1 to 200 bar, more preferably from 20 to 100 bar.

The invention is further illustrated by the following non-limiting examples.

EXAMPLE 1

A magnetically stirred autoclave having a capacity of 250 ml was charged with a catalyst solution comprising:

10 ml of methanol, 40 ml diglyme, 0.1 mmol of palladium acetate, 0.15 mmol of 2-(diphenylphosphino)benzenesulphonic acid.

Air was removed from the autoclave by evacuation, after which ethene was introduced until a pressure of 40 bar was reached. Subsequently, carbon monoxide was introduced until a pressure of 15 bar was reached. The autoclave was heated to 95° C. and polymerization was allowed to proceed for 10 hours, after which it was terminated by cooling to room temperature followed by releasing the pressure. The polymeric product obtained was filtered off, washed with methanol and dried in vacuo at room temperature, 3.5 gram of polymer was obtained having a melting point of 210° C. as determined with Differential Scanning Calorimetry (DSC), operated using a temperature gradient of 10° C./min.

Analysis with MAS-$^{13}$C NMR (Magic Angle Spinning-$^{13}$C NMR) showed that a linear copolymer was obtained in which the molar ratio of monomer units originating from ethene and monomer units originating from carbon monoxide was 57.5:42.5. Thus, a total of 15% of the chemical bonds formed during polymerization was present as linkage between ethene units, 73% of which was contained in entities of two ethene units and the remaining 27% in entities of three or more ethene units. The remaining 0.5% of the bonds formed during polymerization were carbon monoxide-ethene linkages. The occurrence of branching was not detectable, implying that less than 0.5% of the ethene units carried a polymeric or another substituent.

EXAMPLE 2

A magnetically stirred autoclave having a capacity of 250 ml was charged with a catalyst solution comprising:

10 ml of methanol, 40 ml of diglyme 0.25 mmol of palladium acetate, 0.3mmol of 2-(diphenylphosphino)benzenesulphonic acid, and 0.3 mmol methanesulphonic acid.

Air was removed from the autoclave by evacuation, after which ethene was introduced until a pressure of 40 bar was reached. Subsequently, the temperature was raised to 84° C., after which it was terminated by cooling to room temperature followed by releasing the pressure. The polymeric product thus obtained was filtered off, washed with methanol and dried in vacuo at room temperature. 5 gram of polymeric product was formed. The polymeric product exhibited two melting endotherms as determined with DSC, operated using a temperature gradient of 10° C./min. at 125° C. and 225° C.

Analysis with MAS-$^{13}$C NMR showed that about 30% by weight of the polymeric product was polyethylene (m.p. 125° C.) and that the remaining portion was a linear copolymer A-B, with A being a polyethylene block and B being an ethylene/CO copolymer. The molar ratio of monomer units originating from ethene to monomer units originating from carbon monoxide was 55:45. The polymer contained 10% of ethene-ethene linkages, the remaining 90% being carbon monoxide-ethene linkages (m.p. 225° C.).

Both polymers obtained may be separated, e.g. by means of extraction.

Comparative Example 1

The procedure of Example 1 was repeated except that after removal of air from the autoclave by evacuation ethene was introduced until a pressure of 20 bar was reached after which carbon monoxide was introduced until a pressure of 20 bar was reached. 7 gram of polymer was obtained having a melting point of 250° C. as determined with DSC having a temperature gradient of 10° C./min.

Analysis with MAS-$^{13}$C NMR showed that the linear copolymer contained no ethene-ethene linkages and was a perfectly alternating ethylene/CO copolymer.

While this invention has been described in detail for the purpose of illustration, it is not to be construed as limited thereby but is intended to cover all changes and modifications within the spirit and scope thereof.

What is claimed is:

1. A polymer of carbon monoxide and one or more olefinically unsaturated compounds wherein the polymer chain is linear, and contains units originating from the olefinically unsaturated compounds and monomer units originating from the carbon monoxide in a molar ratio of from 52.5:47 to 80:20, having therein monomer units arranged in a random order, and wherein from about 50 to 95% of the bonds between monomer units comprise olefinically unsaturated monomers bonded to each other.

2. A copolymer as in claim 1 wherein said molar ratio is 70:30.

3. A copolymer chain as in claim 1 wherein of all of the bonds between monomer units originating from said olefinically unsaturated compound, 50 to 95% is contained in entities consisting of two of said monomers.

4. A copolymer as in claim 1 wherein at least one end of the copolymer chain is a homopolymer block of said olefinically unsaturated compound.

5. A copolymer as in claim 4 wherein said homopolymer block constitutes from 10 to 50 weight percent of said copolymer.

6. A copolymer as in claim 1 wherein said olefinically unsaturated monomer is an α-olefin.

7. A copolymer as in claim 6 wherein said α-olefin is ethene.

8. A process of the preparation of linear polymers of carbon monoxide and one or more olefinically unsaturated compounds, having therein monomer units arranged in a random order wherein from about 50 to 95% of the bonds between monomer units comprise olefinically unsaturated monomers bonded to each other, which process comprises contacting carbon monoxide and one or more olefinically unsaturated compounds in the presence of a catalyst composition comprising:

(a) a source of palladium, and (b) an anionic phosphorous monodentate ligand of the general formula $R_1R_2P$—R—X, wherein $R_1$ and $R_2$ independently represent optionally polar substituted hydrocarbyl groups, R is a bivalent bridging group having 2 carbon atoms in the bridge and X is an anionic group, which anionic ligand is derived from an acid having a pKa of less than 4, wherein the molar ratio of carbon monoxide to the olefinically unsaturated compounds(s) is in the range of from 1:30 to 1:3, and recovering said polymers wherein from about 50 to 95% of the bonds between monomer units comprise olefinically unsaturated monomers bonded to each other.

9. A process as in claim 8 wherein the molar ratio of said carbon monoxide to said olefinically unsaturated compound is in the range of from 1:15 to 1:5.

10. A process as in claim 8 wherein said $R_1$ and $R_2$ are phenyl groups.

11. A process as in claim 8 wherein R is 1,2 ethylene.

12. A process as in claim 8 wherein R is 1,2 phenylene.

13. A process as in claim 8 wherein said anionic group X is a sulphonate group.

14. A process as in claim 8 wherein component (b) of the catalyst system is derived from 2-(diphenylphosphine)-benzenesulphonic acid.

15. A shaped article of manufacture prepared from the copolymer of claim 1.

* * * * *